United States Patent
Omori et al.

(10) Patent No.: US 6,934,146 B2
(45) Date of Patent: Aug. 23, 2005

(54) NIOBIUM POWDER, NIOBIUM SINTERED BODY AND CAPACITOR USING THE SINTERED BODY

(75) Inventors: Kazuhiro Omori, Kanagawa (JP); Kazumi Naito, Chiba (JP); Toshiya Kawasaki, Kanagawa (JP); Kouichi Wada, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 31 days.

(21) Appl. No.: 10/343,912

(22) PCT Filed: May 14, 2002

(86) PCT No.: PCT/JP02/04644

§ 371 (c)(1),
(2), (4) Date: Feb. 6, 2003

(87) PCT Pub. No.: WO02/092864

PCT Pub. Date: Nov. 21, 2002

(65) Prior Publication Data

US 2003/0218857 A1 Nov. 27, 2003

Related U.S. Application Data

(60) Provisional application No. 60/291,925, filed on May 21, 2001, and provisional application No. 60/331,200, filed on Nov. 9, 2001.

(30) Foreign Application Priority Data

May 15, 2001 (JP) .................................. 2001-145571
Nov. 6, 2001 (JP) .................................. 2001-340318

(51) Int. Cl.$^7$ ................................. H01G 9/00
(52) U.S. Cl. .................. 361/501; 361/502; 361/508; 361/509; 361/516; 361/524; 361/321.1; 75/255; 75/343; 75/346
(58) Field of Search .......................... 361/501, 504, 361/508, 509, 511, 516, 519, 524, 528, 529, 502, 512, 523, 303, 306.1, 321.1, 321.4, 311, 313; 75/255, 343, 346

(56) References Cited

U.S. PATENT DOCUMENTS

| 4,084,965 A | 4/1978 | Fry |
| 6,165,623 A | 12/2000 | Fife et al. |
| 2003/0089197 A1 * | 5/2003 | Wada et al. ................. 75/255 |
| 2003/0172774 A1 * | 9/2003 | Naito et al. ................. 75/244 |

FOREIGN PATENT DOCUMENTS

| EP | 1 204 126 A1 | 5/2002 |
| JP | 55-157226 A | 12/1980 |
| JP | 10-242004 A | 9/1998 |
| JP | 2000-119710 A | 4/2000 |
| JP | 2000-188243 | 7/2000 |
| WO | WO 00/67936 A1 | 11/2000 |
| WO | WO 01/12364 A1 | 2/2001 |

* cited by examiner

Primary Examiner—Anthony Dinkins
Assistant Examiner—Nguyen T. Ha
(74) Attorney, Agent, or Firm—Sughrue Mion, PLLC

(57) ABSTRACT

A niobium powder for a capacitor having a tapping density of 0.5 to 2.5 g/ml, and average particle size of 10 to 1000 μmum, angle of repose form 10° to 60°, the BET specific surface area from 0.5 to 40 m$^2$/g and a plurality of pore diameter peak tops in the pore distribution, and a producing method therof; (2) a niobium sintered body, which is obtained by sintering the above niobium powder and, having a plurality of pore diameter peak tops in a range of 0.01 μmum to 500 μmum, preferably, the peak tops of two peaks among the plurality of pore diameter peak tops having a highest relative intensity are present in the range of 0.2 to 0.7 μmum and in the range of 0.7 to 3 μmum, respectively, and a producing method thereof; (3) a capacitor using the above sintered body and a producing method thereof, and (4) an electronic circuit and electronic device using the above capacitor.

58 Claims, 2 Drawing Sheets

NIOBIUM POWDER, NIOBIUM SINTERED BODY AND CAPACITOR USING THE SINTERED BODY

Figure 1:
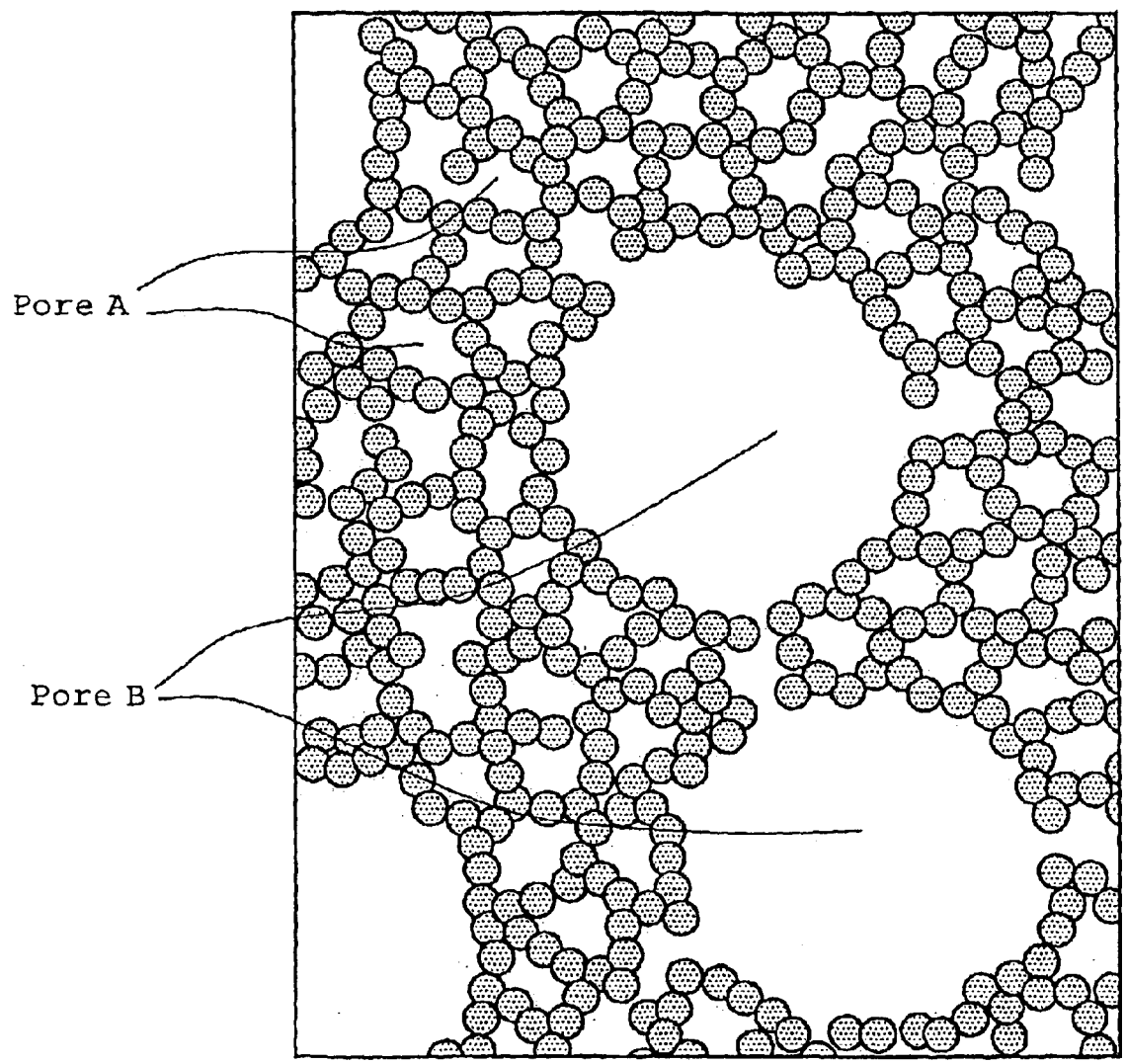
Figure 2:
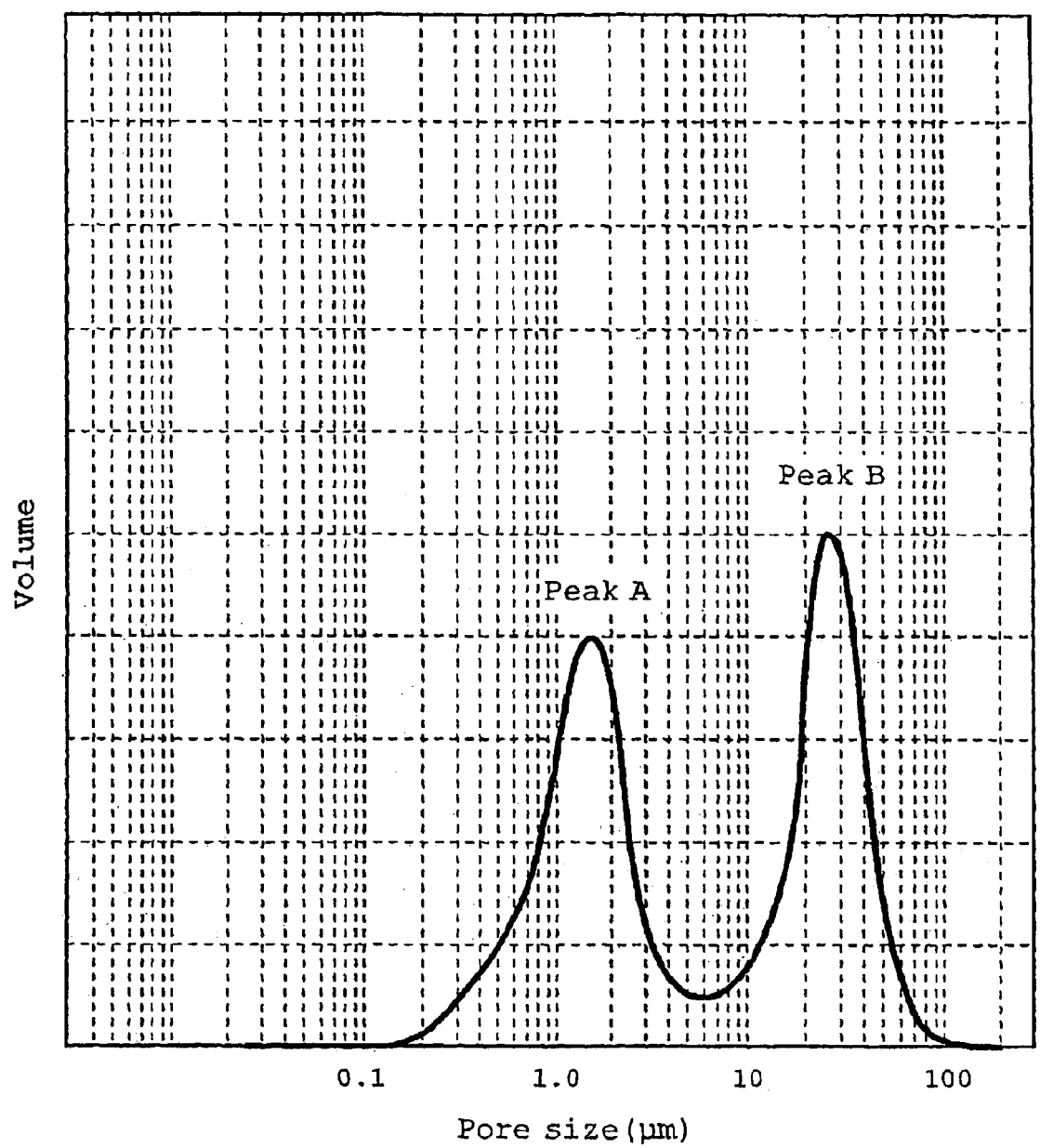

This application is a 371 of PCT/JP02/04644 filed May 15, 2002, which claims the benefit of Provisional application Ser. Nos. 60/291,925, filed May 21, 2001, and 60/331,200, filed Nov. 9, 2001.

DETAILED DESCRIPTION OF THE INVENTION

1. [Technical Field to Which the Invention Belongs]

The present invention relates to a niobium powder capable of stably producing a capacitor having a large capacitance per unit mass and good leakage current characteristics, and also relates to a sintered body using the niobium powder, a capacitor using the sintered body and production methods of the niobium powder, the sintered body and the capacitor.

2. [Background Art]

Capacitors for use in electronic instruments such as potable telephone and personal computer are demanded to have a small size and a large capacitance. Among these capacitors, a tantalum capacitor is preferred because of its large capacitance for the size and good performance. In this tantalum capacitor, a sintered body of tantalum powder is generally used for the anode moiety. In order to increase the capacitance of the tantalum capacitor, it is necessary to increase the mass of the sintered body or to use a sintered body increased in the surface area by pulverizing the tantalum powder.

The method of increasing the mass of the sintered body necessarily involves enlargement of the capacitor shape and cannot satisfy the requirement for downsizing. On the other hand, in the method of pulverizing tantalum powder to increase the specific surface area, the pore size of the tantalum sintered body decreases or closed pores increase at the stage of sintering, as a result, impregnation of the cathode agent in the later step becomes difficult. As one of means for solving these problems, a capacitor using a sintered body of a material having a dielectric constant larger than that of tantalum may be considered. Niobium is known as the material having a larger dielectric constant.

JP-A-55-157226 (the term "JP-A" as used herein means an "unexamined published Japanese patent application") discloses a method for producing a sintered device for capacitors, where agglomerated powder is molded under pressure into niobium fine powder having a particle size of 2.0 μm or less, the fine powder is sintered, the molded and sintered body is cut into fine pieces, a lead part is joined therewith and these are again sintered. However, the details on the properties of the capacitor are not described in this patent publication.

U.S. Pat. No. 4,084,965 discloses a capacitor using a sintered body of niobium powder having an average particle size of 5.1 μm obtained by hydrogenating and pulverizing a niobium ingot. However, the capacitor disclosed has a large leakage current (hereinafter sometimes simply referred to as "LC") value and the practicability thereof is low.

JP-A-10-242004 discloses a technique of partially nitriding a niobium powder and thereby improving the LC value.

The tapping density of a niobium powder for capacitors is an important factor in the mold working of the niobium powder. The tapping density of conventional niobium powders is 2.5 g/ml or more, specifically about 4 g/ml, and this is insufficient for the molding.

More specifically, if such a niobium powder is molded and sintered to prepare a sintered body, the niobium powder poorly flows from the hopper of a molding machine to the metal mold and it is difficult to weigh a constant amount of niobium powder and charge it into the metal mold.

This gives rise to problems such that the shape of the molded article is not satisfactorily stabilized, the molded article and the sintered body are deficient in the strength, and a capacitor having bad LC is produced with high frequency.

If a special molding apparatus capable of also handling a powder having bad flowability is used, the molding cost excessively increases and this is not practical.

As such, conventionally known niobium powders for capacitors have a problem in that the powder cannot be fully adapted to continuous molding and the productivity of capacitor is low.

Problems to be Solved by the Invention

The object of the present invention is to provide a niobium powder exhibiting good flowability in the mold working, facilitating continuous molding and enabling stable production of a capacitor having a small leakage current; a sintered body using the niobium powder; a capacitor using the sintered body; and production methods of the niobium powder, the sintered body and the capacitor.

[Means to Solve the Problems]

As a result of extensive investigations to solve the above-described problems, the present inventors have found that a niobium powder having a tapping density of 0.5 to 2.5 g/ml and preferably having an average particle size of 10 to 1,000 μm exhibits good flowability and enables continuous molding and when this niobium powder is used, a capacitor having a small leakage current can be stably produced. The present invention has been accomplished based on this finding.

More specifically, the present invention relates to the following niobium powder, production method thereof, sintered body using the niobium powder, and capacitor using the sintered body.

(1) A niobium powder having a tapping density of 0.5 to 2.5 g/ml.

(2) The niobium powder as described in 1 above, wherein the average particle size is from 10 to 1,000 μm.

(3) The niobium powder as described in 1 or 2 above, wherein the angle of repose is from 10 to 60°.

(4) The niobium powder as described in any one of 1 to 3 above, wherein the BET specific surface area is from 0.5 to 40 m²/g.

(5) The niobium powder as described in any one of 1 to 4 above, wherein the pore size peak top is in the range of 0.01 to 500 μm.

(6) The niobium powder as described in 5 above, which has a plurality of pore size peak tops.

(7) The niobium powder as described in any one of 1 to 6 above, wherein the content of at least one element selected from the group consisting of nitrogen, carbon, boron and sulfur elements is from 0 to 200,000 mass ppm.

(8) A sintered body using the niobium powder described in any one of 1 to 7 above.

(9) The sintered body as described in 8 above, wherein the pore size peak top is in the range of 0.01 to 500 µm.

(10) The niobium sintered body as described in 9 above, which has a plurality of pore size peak tops.

(11) A capacitor comprising the niobium sintered body described in any one of 8 to 10 above as one part electrode, a dielectric material formed on the surface of the sintered body, and another part electrode provided on the dielectric material.

(12) The capacitor as described in 11 above, wherein the dielectric material mainly comprises niobium oxide.

(13) The capacitor as described in 11 above, wherein the another part electrode is at least one material selected from the group consisting of an electrolytic solution, an organic semiconductor and an inorganic semiconductor.

(14) The capacitor as described in 13 above, wherein the another part electrode is an organic semiconductor and the organic semiconductor is at least one material selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an electrically conducting polymer.

(15) The capacitor as described in 14 above, wherein the electrically conducting polymer is at least one member selected from the group consisting of polypyrrole, polythiophene, polyaniline and substitution derivatives thereof.

(16) The capacitor as described in 14 above, wherein the electrically conducting polymer is an electrically conducting polymer obtained by doping a dopant into a polymer containing a repeating unit represented by the following formula (1) or (2):

[Chem. 1]

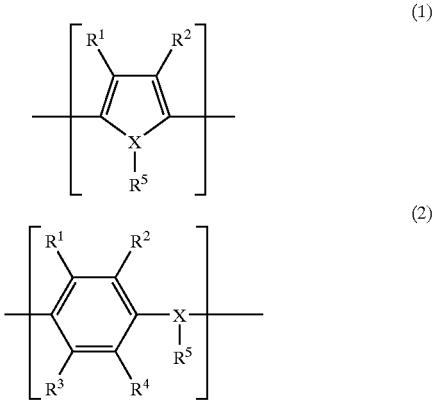

(wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms).

(17) The capacitor as described in 16 above, wherein the electrically conducting polymer is an electrically conducting polymer containing a repeating unit represented by the following formula (3):

[Chem. 2]

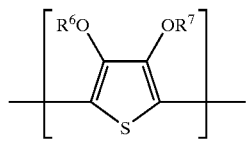

(wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted).

(18) The capacitor as described in 14 above, wherein the electrically conducting polymer is an electrically conducting polymer obtained by doping a dopant into poly(3,4-ethylenedioxythiophene).

(19) The capacitor as described in 11 above, wherein the another part electrode is composed of a material at least partially having a layer structure.

(20) The capacitor as described in 11 above, wherein the another part electrode is a material containing an organic sulfonate anion as a dopant.

(21) A method for producing the niobium powder described in any one of 1 to 7 above, comprising activation-treating niobium or a niobium compound.

(22) The method for producing the niobium powder as described in 21 above, wherein the activation treatment is performed by at least one step selected from the group consisting of a sintering step and a cracking step.

(23) The method for producing the niobium powder as described in 21 or 22 above, wherein the activation treatment of niobium or a niobium compound is performed using a mixture of niobium or a niobium compound and an activator.

(24) The method for producing the niobium powder as described in any one of 21 to 23 above, wherein the average particle size of the niobium or niobium compound is from 0.01 to 10 µm.

(25) The method for producing the niobium powder as described in any one of 21 to 24 above, wherein the niobium or niobium compound contains at least one element selected from the group consisting of nitrogen, carbon, boron and sulfur in an amount of 0 to 200,000 ppm.

(26) The method for producing the niobium powder as described in any one of 21 to 25 above, wherein the niobium compound is at least one member selected from the group consisting of niobium hydride, niobium alloy and niobium hydride alloy.

(27) The method for producing the niobium powder as described in 26 above, wherein the component of the niobium alloy or niobium hydride alloy other than niobium is at least one element selected from the group consisting of elements having an atomic number of 88 or less excluding hydrogen, nitrogen, oxygen, fluorine, chlorine, bromine, iodine, niobium, helium, neon, argon, krypton, xenon and radon.

(28) The method for producing the niobium powder as described in 23 above, wherein the mixture containing niobium or a niobium compound and an activator is obtained by mixing these using a solvent.

(29) The method for producing the niobium powder as described in 2B above, wherein the solvent is at least one solvent selected from the group consisting of water, alcohols, ethers, cellosolves, ketones, aliphatic hydrocarbons, aromatic hydrocarbons and halogenated hydrocarbons.

(30) The method for producing the niobium powder as described in 23 above, wherein the activator is used in an amount of 1 to 40 mass % based on the total amount of the niobium or niobium compound.

(31) The method for producing the niobium powder as described in 23 or 30 above, wherein the average particle size of the activator is from 0.01 to 500 $\mu$m.

(32) The method for producing the niobium powder as described in any one of 23, 30 and 31 above, wherein the activator has a plurality of particle size peak tops.

(33) The method for producing the niobium powder as described in any one of 23 to 32 above, wherein the activator is a substance which is removed as a gas at 2,000° C. or less.

(34) The method for producing the niobium powder as described in 33 above, wherein the activator is at least one member selected from the group consisting of naphthalene, anthracene, quinone, camphor, polyacrylic acid, polyacrylic acid ester, polyacrylamide, polymethacrylic acid, polymethacrylic acid ester, polymethacrylamide, polyvinyl alcohol, $NH_4Cl$, ZnO, $WO_2$, $SnO_2$ and $MnO_3$.

(35) The method for producing the niobium powder as described in any one of 23 to 32 above, wherein the activator is at least one member selected from the group consisting of a water-soluble substance, an organic solvent-soluble substance, an acidic solution-soluble substance, an alkaline solution-soluble substance, a substance of forming a complex and becoming a substance soluble in water, organic solvent, acidic solution or alkaline solution, and a substance of becoming a substance soluble in water, organic solvent, acidic solution or alkaline solution at 2,000° C. or less.

(36) The method for producing the niobium powder as described in 35 above, wherein the activator is at least one member selected from the group consisting of compounds of a metal with carbonic acid, sulfuric acid, sulfurous acid, halogen, perhalogen acid, hypohalogen acid, nitric acid, nitrous acid, phosphoric acid or boric acid, metals, metal hydroxides and metal oxides.

(37) The method for producing the niobium powder as described in 35 above, wherein the activator is at least one member selected from the group consisting of lithium, sodium, potassium, rubidium, cesium, francium, beryllium, magnesium, calcium, strontium, barium, radium, scandium, yttrium, cerium, neodymium, titanium, zirconium, hafnium, vanadium, niobium, tantalum, molybdenum, tungsten, manganese, rhenium, ruthenium, osmium, cobalt, rhodium, iridium, nickel, palladium, platinum, silver, gold, zinc, cadmium, boron, aluminum, gallium, indium, thallium, silicon, germanium, tin, lead, arsenic, antimony, bismuth, selenium, tellurium, polonium and compounds thereof.

(38) The method for producing the niobium powder as described in any one of 21 to 34 above, wherein the activation treatment is a treatment of performing the removal of the activator under heating and/or reduced pressure before or during the sintering step.

(39) The method for producing the niobium powder as described in any one of 21 to 32 and 35 to 37 above, wherein the activation treatment is a treatment of removing the activator component by contacting a solvent with the sintered or cracked product after the sintering step or during or after the cracking step.

(40) The method for producing the niobium powder as described in 39 above, wherein the solvent is at least one member selected from the group consisting of water, an organic solvent, an acidic solution, an alkaline solution and a solution containing a ligand of forming a soluble complex.

(41) The method for producing the niobium powder as described in 40 above, wherein the acidic solution is a solution of at least one member selected from the group consisting of nitric acid, sulfuric acid, hydrofluoric acid and hydrochloric acid.

(42) The method for producing the niobium powder as described in 40 above, wherein the alkaline solution contains at least one member selected from the group consisting of an alkali metal hydroxide and ammonia.

(43) The method for producing the niobium powder as described in 40 above, wherein the ligand is at least one member selected from the group consisting of ammonia, glycine and ethylenediaminetetraacetic acid.

(44) The method for producing the niobium powder as described in 40 above, wherein the organic solvent is methyl isobutyl ketone.

(45) A method for producing a nitrogen-containing niobium powder, comprising treating the niobium powder described in any one of 1 to 6 above by at least one method selected from the group consisting of liquid nitridation, ion nitridation and gas nitridation.

(46) A method for producing a carbon-containing niobium powder, comprising treating the niobium powder described in any one of 1 to 6 above by at least one method selected from the group consisting of solid phase carbonization and liquid carbonization.

(47) A method for producing a boron-containing niobium powder, comprising treating the niobium powder described in any one of 1 to 6 above by at least one method selected from the group consisting of gas boronization and solid phase boronization.

(48) A method for producing a sulfur-containing niobium powder, comprising treating the niobium powder described in any one of 1 to 6 above by at least one method selected from the group consisting of gas sulfudization, ion sulfudization and solid phase sulfudization.

(49) A niobium powder obtained by the production method described in any one of 21 to 48 above.

(50) A method for producing a niobium sintered body, comprising using the niobium powder described in any one of 1 to 7 and 49 above.

(51) A method for producing a capacitor comprising a niobium sintered body as one part electrode, a dielectric material formed on the surface of the sintered body, and another part electrode provided on the dielectric material, wherein the niobium sintered body is obtained by sintering the niobium powder described in any one of 1 to 7 and 49 above.

(52) The method for producing a capacitor as described in 51 above, wherein the dielectric material is formed by electrolytic oxidation.

(53) An electronic circuit using the capacitor described in any one of 11 to 20 above.

(54) An electronic instrument using the capacitor described in any one of 11 to 20 above.

Mode for Carrying Out the Invention

The niobium powder having good flowability and capable of continuous molding, which can give a capacitor having good leakage current property and bring out that property, the niobium sintered body using the niobium powder, and the capacitor using the niobium sintered body are described below.

In the present invention, the niobium powder for capacitors used as the niobium powder which satisfies the above-described property of a capacitor and improves the productivity in the production of capacitors has a tapping density of 0.5 to 2.5 g/ml.

The niobium powder for capacitors as used herein means a niobium powder mainly comprising niobium and capable of being a raw material for the production of a capacitor.

The sintered body for capacitors can be obtained, for example, by molding and sintering the niobium powder as follows.

The niobium powder for capacitors is added to a solution obtained by dissolving a binder which is described later, in an organic solvent such as toluene or methanol, and thoroughly mixed using a shaking mixer or a V-type mixer. Then, the organic solvent is removed by distillation under reduced pressure using a drier such as conical drier to prepare a niobium mixed powder containing the binder. This mixed powder is charged into the hopper of an automatic molding machine, weighed while flowing the niobium powder through an inlet tube from the hopper to the metal mold of the molding machine to automatically cause spontaneous falling in the metal mold, and molded together with a lead wire. After removing the binder, this molded article is sintered at 500 to 2,000° C. under reduced pressure to manufacture a niobium sintered body.

In the case of a mixed powder having no appropriate flowability or angle of repose, the powder does not smoothly flow from the hopper to the metal mold and the molding cannot be stably performed. In particular, since the mixed powder is transported from the hopper using a method such as vibration, too large or too small tapping density or average particle size of the mixed powder leads to large dispersion in the mass of the molded article or in the strength or shape of the sintered body and in some cases, to the generation of chipping or cracking, resulting in a bad leakage current value. As such, the tapping density, the average particle size, the flowability and the angle of repose of the mixed powder are important factors for producing a good sintered body and a good capacitor.

These physical properties of the mixed powder scarcely change between before and after the mixing with a binder but are determined by the physical properties of the niobium powder for capacitors used. Accordingly, important are the tapping density, the average particle size, the flowability and the angle of repose of the niobium powder used. The flowability and the angle of repose of the niobium powder are greatly affected by the tapping density or the average particle size and therefore, the tapping density and the average particle size become important factors.

In the present invention, for improving the flowability or angle of repose to increase the productivity and the strength of the sintered body and thereby obtaining an effect of reducing the leakage current, the tapping density is preferably from 0.5 to 2.5 g/ml, more preferably from 0.8 to 1.9 g/ml. The average particle size of the niobium powder of the present invention is preferably from 10 to 1,000 $\mu$m, more preferably from 50 to 200 $\mu$m.

For allowing the niobium powder to spontaneously fall from the hopper to the metal mold of a molding machine, the angle of repose of the niobium powder of the present invention is preferably from 10 to 60°, more preferably from 10 to 50°.

The niobium powder having the above-described physical properties can be produced starting from a mixture (hereinafter referred to as "a starting material mixture") containing a niobium powder or a niobium compound powder (hereinafter these are called "a starting material niobium powder") and an activator (hereinafter sometimes referred to as "an additive") through at least a sintering step and a cracking step in sequence.

The activator is removed in either the sintering step or the cracking step during the production of the niobium powder of the present invention from the starting material mixture. The removal of the activator may also be performed independently from the sintering step or the cracking step.

Examples of the method for removing the activator include a method of evaporating, sublimating or thermally decomposing the activator and removing it as a gas, and a method of removing the activator by dissolving it in a solvent.

In the case of removing the activator as a gas, the removal may be performed in the sintering step, or a step of removing the activator under heating and/or reduced pressure may be provided before the sintering.

In the case of removing the activator by dissolving it in a solvent, a solvent which is described later is contacted with the sintered product or a cracked product thereof after the sintering of the starting material mixture or during or after the cracking, thereby dissolving and removing the activator.

Various methods for removing the activator can be arbitrarily employed according to the chemical properties of the activator. One of the methods capable of easily removing the activator may be used or a plurality of these methods may be used in combination.

A step of nitriding, boronizing, carbonizing or sulfudizing a part of niobium powder may be provided at any stage in the process of producing the niobium powder of the present invention from the starting material mixture.

The method for producing the niobium powder of the present invention is described in detail below.

The starting material niobium powder which can be used is at least one powder selected from niobium, niobium hydride, niobium alloy and niobium hydride alloy. A part of this powder may be nitrided, sulfudized, carbonized or boronized. The "alloy" as used in the present invention includes a solid solution with other alloy component.

The average particle size of the starting material niobium powder is preferably from 0.01 to 10 $\mu$m.

Examples of the method for obtaining niobium used as the starting material niobium powder include a method of hydrogenating, pulverizing and dehydrogenating a niobium ingot, a niobium pellet or a niobium powder, a method of reducing potassium fluoroniobate with sodium or the like and pulverizing the reduction product, a method of reducing niobium oxide using at least one of hydrogen, carbon, magnesium and aluminum and pulverizing the reduction product, and a method of hydrogen-reducing niobium halide.

Examples of the method for obtaining niobium hydride used as the starting material niobium powder include a method of hydrogenating and pulverizing a niobium ingot, a niobium pellet or a niobium powder.

Examples of the method for obtaining a niobium hydride alloy used as the starting material niobium powder include a method of pulverizing a hydride of niobium alloy ingot, niobium alloy pellet or niobium alloy powder. Examples of the method for obtaining a niobium alloy used as the starting material niobium powder include a method of dehydrogenating a niobium hydride alloy obtained as above.

The niobium alloy or niobium hydride alloy contains, as an alloy component other than niobium, at least one element selected from the group consisting of the elements having an atomic number of 88 or less excluding hydrogen, nitrogen, oxygen, fluorine, chlorine, bromine, iodine, niobium, helium, neon, krypton, argon, xenon and radon.

The activator is a substance which can be removed in any step during the production of the niobium powder of the present invention from the starting material mixture. In the niobium powder of the present invention, a pore is usually formed in the portion where the activator is removed.

The particle size of the activator affects the pore size of the niobium powder of the present invention, the pore size of the niobium powder affects the pore size of the niobium sintered body, and the pore size of the niobium sintered body affects the capacitance of a capacitor and the impregnating ability of a cathode agent in the production step of a capacitor.

The average pore size is preferably from 0.01 to 500 $\mu$m, more preferably from 0.03 to 300 $\mu$m, still more preferably from 0.1 to 200 $\mu$m. For having a pore size in this range, the average particle size of the activator is preferably from 0.01 to 500 $\mu$m, more preferably from 0.03 to 300 $\mu$m, still more preferably from 0.1 to 200 $\mu$m.

The pore size may be reduced by using an activator having a small particle size and the pore size may be increased by using an activator having a large particle size.

The pore size distribution can be adjusted by adjusting the particle size distribution of the activator.

In order to cause no problem in the impregnating ability of a cathode agent and obtain a capacitor having a sufficiently large capacitance, it is preferred to appropriately provide pores small enough to give a desired capacitance and pores large enough to ensure satisfactory impregnation of a cathode agent, in the niobium sintered body according to the physical properties of the cathode agent.

For adjusting the pore size distribution of the niobium powder or niobium sintered body, for example, the niobium powder can be made to have two or more pore size peak tops by using an activator (powder) having two or more peaks in the particle size distribution. By sintering this niobium powder, a niobium sintered body having two or more equal pore size peak tops can be obtained. In this case, the pore size peak top is preferably present in the range of 0.01 to 500 $\mu$m, more preferably from 0.03 to 300 $\mu$m, still more preferably from 0.1 to 200 $\mu$m.

The activator having two or more peaks in the particle size distribution can be obtained, for example, by mixing two or more activators having a different peak in the particle size distribution.

Examples of the substance as the activator include a substance which becomes a gas at the sintering temperature or less, and a substance which is soluble in a solvent at least after the sintering.

Examples of the substance which becomes a gas at the sintering temperature or less include a substance which becomes a gas through evaporation, sublimation or thermal decomposition. An inexpensive substance capable of easily becoming a gas even at a low temperature without causing a residue is preferred.

Examples thereof include aromatic compounds such as naphthalene, anthracene and quinone, camphor, $NH_4Cl$, ZnO, $WO_2$, $SnO_2$, $MnO_3$ and organic polymers.

Examples of the organic polymer include polyacrylic acid, polyacrylic acid ester, polyacrylamide, polymethacrylic acid, polymethacrylic acid ester, polymethacrylamide and polyvinyl alcohol.

The substance which is soluble at least after the sintering is a substance such that the residue of the activator or a thermally decomposed product thereof is soluble in a solvent. A substance capable of easily dissolving in a solvent which is described later, after the sintering or during or after the cracking is particularly preferred. This substance can be selected from many substances according to the combination with the solvent.

Examples of such a substance include compounds of a metal with carbonic acid, sulfuric acid, sulfurous acid, halogen, perhalogen acid, hypohalogen acid, nitric acid, nitrous acid, phosphoric acid, acetic acid, oxalic acid or boric acid, metal oxides, metal hydroxides and metals.

Among these, preferred are compounds having a large solubility in a solvent such as acid, alkali or ammonium salt solution which are described later. Examples thereof include compounds containing at least one member selected from the group consisting of lithium, sodium, potassium, rubidium, cesium, francium, beryllium, magnesium, calcium, strontium, barium, radium, scandium, yttrium, cerium, neodymium, erbium, titanium, zirconium, hafnium, vanadium, niobium, tantalum, molybdenum, tungsten, manganese, rhenium, ruthenium, osmium, cobalt, rhodium, iridium, nickel, palladium, platinum, silver, gold, zinc, cadmium, aluminum, gallium, indium, thallium, germanium, tin, lead, antimony, bismuth, selenium, tellurium, polonium, boron, silicon and arsenic. Among these, preferred are metal salts and more preferred are, for example, barium oxide, manganese(II) nitrate and calcium carbonate.

These activators may be used individually or in combination of two or more thereof.

If the activator is added in a small amount, the tapping density and the angle of repose become large, whereas if added in a large amount, the tapping density becomes small and closed pores increase at the stage of sintering. For not causing the problem of closed pores at the sintering stage and for obtaining a repose angle of 60° or less and a tapping density of 0.5 to 2.5 g/ml, the amount of the activator added is generally from 1 to 40 mass % (unless otherwise indicated, mass % is hereinafter simply referred to as %), preferably from 5 to 25%, more preferably from 10 to 20%, based on the starting material niobium, though this varies depending on the average particle size of the activator.

The starting material mixture may be obtained by mixing the activator and the niobium starting material each in the powder form using no solvent or by mixing the activator and the niobium starting material using an appropriate solvent and drying the mixture.

Examples of the solvent which can be used include water, alcohols, ethers, cellosolves, ketones, aliphatic hydrocarbons, aromatic hydrocarbons and halogenated hydrocarbons.

The mixing may be performed using a mixer. As for the mixer, a normal apparatus such as shaking mixer, V-type mixer and Nauter mixer may be used without any problem. The temperature at the mixing is limited by the boiling point and freezing point of the solvent but is generally from −50° C. to 120° C., preferably from −50° C. to 50° C., more preferably from −10° C. to 30° C. The time spent for the mixing is not particularly limited insofar as it is 10 minutes or more, however, the mixing is generally performed for 1 to 6 hours preferably in an oxygen-free atmosphere using an inert gas such as nitrogen or argon.

In the case of using a solvent, the mixture obtained is dried at less than 80° C., preferably less than 50° C., using a conical drier or a compartment drier. If the mixture is dried at a temperature of 80° C. or more, the oxygen amount in the niobium or niobium hydride powder disadvantageously increases.

In the case where the activator becomes a gas at the sintering temperature or less, the activator may be removed at the sintering but a step of forming the activator into a gas and removing it before the sintering may be independently provided by setting the conditions such as temperature, pressure and time period to those of facilitating the removal according to the chemical properties of the activator. In this case, the activator is removed by distillation, for example, at 100 to 800° C. under reduced pressure within a few hours.

In the case of using a niobium hydride or niobium hydride alloy as the starting material niobium, the dehydrogenation can be attained by performing the above-described step irrespective of the kind of the activator.

The sintering step is performed at 500 to 2,000° C., preferably from 800 to 1,500° C., more preferably from 1,000 to 1,300° C., under reduced pressure or in a reducing atmosphere such as argon. After the completion of sintering, the sintered product is preferably cooled until the niobium temperature (sometimes simply referred to as a "product temperature") becomes 30° C. or less, an inert gas such as nitrogen or argon containing from 0.01 to 10 vol %, preferably from 0.1 to 1 vol % of oxygen is gradually added such that the product temperature does not exceed 30° C., and after standing for 8 hours or more, the sintered product is taken out to obtain a sintered lump.

In the cracking step, the sintered lump is cracked to an appropriate particle size using a cracking machine such as roll granulator.

In the case where the activator is soluble in a solvent at least after the sintering step, an appropriate solvent is contacted with the sintered lump or the cracked powder after the sintering, before, during or after the cracking or at a plurality of these steps, whereby the activator component is dissolved and removed. In view of easiness of the removal, the activator component is preferably dissolved and removed from the cracked powder after cracking.

The solvent used here is a solvent in which the activator to be dissolved has a sufficiently high solubility. A solvent which is inexpensive and hardly remains is preferred. For example, in the case of a water-soluble activator, water may be used; in the case of an organic solvent-soluble activator, an organic solvent such as methyl isobutyl ketone, ethanol or dimethyl sulfoxide (DMSO) may be used; in the case of an acid-soluble activator, an acid solution such as nitric acid, sulfuric acid, phosphoric acid, boric acid, carbonic acid, hydrofluoric acid, hydrochloric acid, hydrobromic acid, hydroiodic acid or organic acid may be used; in the case of an alkali-soluble activator, an alkali solution such as hydroxide of alkali metal, hydroxide of alkaline earth metal, or ammonia may be used; and in the case of an activator which forms a soluble complex, a solution of an amine such as ammonia or ethylenediamine, an amino acid such as glycine, a polyphosphoric acid such as sodium tripolyphosphate, a crown ether, a thiosulfate such as sodium thiosulfate, or a chelating agent such as ethylenediaminetetraacetic acid, which becomes a ligand of the complex, may be used.

Specific examples of the combination of an activator and a solvent include barium oxide and water, calcium oxalate and hydrochloric acid, aluminum oxide and aqueous sodium hydroxide solution, hafnium oxide and methyl isobutyl ketone, and magnesium carbonate and aqueous tetrasodium ethylenediaminetetraacetate solution.

After dissolving and removing the activator, the residue is thoroughly washed and dried. For example, in the case where barium oxide is removed with water, the residue is thoroughly washed using ion exchange water until the electric conductivity of the washing water is reduced to 5 µS/cm or less. Subsequently, the product is dried at a product temperature of 50° C. or less under reduced pressure. Here, the amount of the remaining activator or solvent component is usually 100 ppm or less, though this varies depending on the washing conditions.

In order to more improve the LC value, the thus-obtained niobium powder, the sintered lump or the niobium starting material powder may be subjected to nitridation, boronization, carbonization or sulfudization of a part of the niobium powder, or to a plurality of these treatments.

The niobium powder of the present invention may contain the obtained niobium nitride, niobium boride, niobium carbide, niobium sulfide or a plurality of these species. The total content of respective elements of nitrogen, boron, carbon and sulfur varies depending on the shape of the niobium powder, however, it is from 0 to 200,000 ppm, preferably from 50 to 100,000 ppm, more preferably from 200 to 20,000 ppm. If the total content exceeds 200,000 ppm, the capacitor produced is deteriorated in the capacitance characteristics and not suitable as a capacitor.

The nitridation of the niobium powder can be performed by any one of liquid nitridation, ion nitridation and gas nitridation or by a combination thereof. Among these, gas nitridation in a nitrogen gas atmosphere is preferred because the apparatus therefor is simple and the operation is easy. For example, the gas nitridation in a nitrogen gas atmosphere can be attained by allowing the above-described niobium powder to stand in a nitrogen gas atmosphere. With a nitridation atmosphere temperature of 2,000° C. or less and a standing time of 100 hours or less, a niobium powder having an objective nitrided amount can be obtained. The treatment time can be shortened by performing the treatment at a higher temperature.

The boronization of the niobium powder may be either gas boronization or solid phase boronization. For example, the niobium powder may be boronized by allowing it to stand together with a boron pellet or a boron source such as boron halide (e.g., trifluoroboron), at 2,000° C. or less for 1 minute to 100 hours under reduced pressure.

The carbonization of the niobium powder may be any one of gas carbonization, solid phase carbonization and liquid carbonization. For example, the niobium powder may be carbonized by allowing it to stand together with a carbon material or a carbon source such as organic material having carbon (e.g., methane), at 2,000° C. or less for 1 minute to 100 hours under reduced pressure.

The sulfudization of the niobium powder may be any one of gas sulfudization, ion sulfudization and solid phase sulfudization. For example, the gas sulfudization in a sulfur gas atmosphere can be attained by allowing the niobium powder to stand in a sulfur atmosphere. With a sulfudization atmosphere temperature of 2,000° C. or less and a standing time of 100 hours or less, a niobium powder having an objective sulfudized amount can be obtained. The treatment time can be shortened by performing the treatment at a higher temperature.

The BET specific surface area of the thus-obtained niobium powder of the present invention is usually 0.5 to 40 $m^2/g$, preferably 0.7 to 10 $m^2/g$, more preferably 0.9 to 2 $m^2/g$.

The niobium powder of the present invention may be a mixture of niobium powders different in the tapping density, the particle size, the angle of repose, the BET specific surface area, the pore size and the treatment by nitridation, boronization, carbonization or sulfudization.

The sintered body of the present invention, which can be used for the anode of a capacitor, is produced by sintering the above-described niobium powder of the present invention. The production method of sintered body is not particularly limited, however, for example, the sintered body can be obtained by press-molding the niobium powder into a pre-determined shape and then heating it at 500 to 2,000° C., preferably from 800 to 1,500° C., more preferably from 1,000 to 1,300° C., for 1 minute to 10 hours under a pressure of $10^{-5}$ to $10^2$ Pa.

The production of a capacitor device is described below.

For example, a lead wire comprising a valve-acting metal such as niobium or tantalum and having appropriate shape and length is prepared and this lead wire is integrally molded at the press-molding of the niobium powder such that a part of the lead wire is inserted into the inside of the molded article, whereby the lead wire can work out to a leading line of the sintered body. Or, the niobium powder is molded and sintered without using a lead wire and then, a lead wire separately prepared is connected thereto by welding or the like.

Using this sintered body as one part electrode, a capacitor can be produced by interposing a dielectric material between this one part electrode and another part electrode. The dielectric material used here for the capacitor is preferably a dielectric material mainly comprising niobium oxide, more preferably a dielectric material mainly comprising niobium pentaoxide. The dielectric material mainly comprising niobium pentaoxide can be obtained, for example, by electrolytically oxidizing the niobium sintered body as one part electrode. For electrolytically oxidizing the niobium electrode in an electrolytic solution, an aqueous protonic acid solution is generally used, such as aqueous 0.1% phosphoric acid solution, aqueous sulfuric acid solution, aqueous 1% acetic acid solution or aqueous adipic acid solution. In the case of obtaining a niobium oxide dielectric material by electrochemically forming the niobium electrode in an electrolytic solution as such, the capacitor of the present invention is an electrolytic capacitor and the niobium electrode serves as the anode.

In the capacitor of the present invention, the another part electrode (counter electrode) to the niobium sintered body is not particularly limited and, for example, at least one material (compound) selected from electrolytic solutions, organic semiconductors and inorganic semiconductors known in the art of aluminum electrolytic capacitor, can be used.

Specific examples of the electrolytic solution include a dimethylformamide-ethylene glycol mixed solution having dissolved therein 5 mass % of an isobutyltripropylammonium borotetrafluoride electrolyte, and a propylene carbonate-ethylene glycol mixed solution having dissolved therein 7 mass % of tetraethylammonium borotetrafluoride.

Specific examples of the organic semiconductor include an organic semiconductor comprising benzopyrroline tetramer and chloranile, an organic semiconductor mainly comprising tetrathiotetracene, an organic semiconductor mainly comprising tetracyanoquinodimethane, and an electrically conducting polymer containing a repeating unit represented by the following formula (1) or (2):

[Chem. 3]

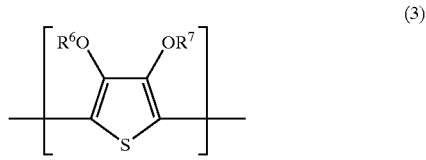

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; hydrocarbon chains of $R^1$ and $R^2$, or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents a hydrogen atom or a linear or branched, saturated or unsaturated alkyl group having from 1 to 10 carbon atoms.

In the present invention, $R^1$ to $R^4$ in formula (1) or (2) each independently represents preferably a hydrogen atom or a linear or branched, saturated or unsaturated alkyl or alkoxy group having from 1 to 6 carbon atoms, and each of the pairs $R^1$ and $R^2$, and $R^3$ and $R^4$ may combine to form a ring.

In the present invention, the electrically conducting polymer containing a repeating unit represented by formula (1) is preferably an electrically conducting polymer containing a structure unit represented by the following formula (3) as a repeating unit:

[Chem. 4]

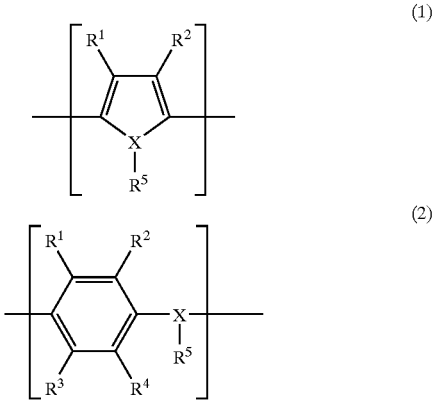

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

The electrically conducting polymer containing such a chemical structure is doped with a dopant and for the dopant, known dopants can be used without limitation.

Specific examples of the inorganic semiconductor include an inorganic semiconductor mainly comprising lead dioxide or manganese dioxide, and an inorganic semiconductor comprising triiron tetraoxide. These semiconductors may be used individually or in combination of two or more thereof.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the organic or inorganic semiconductor used has an electrical conductivity of $10^{-2}$ to $10^3$ S/cm, the capacitor produced can have a smaller impedance value and can be more increased in the capacitance at a high frequency.

The electrically conducting polymer layer is produced, for example, by a method of polymerizing a polymerizable compound such as aniline, thiophene, furan, pyrrole, methylpyrrole or a substitution derivative thereof under the action of an oxidizing agent capable of satisfactorily causing an oxidation reaction of dehydrogenative two-electron oxidation. Examples of the polymerization reaction from the polymerizable compound (monomer) include vapor phase polymerization and solution polymerization. The electrically conducting polymer layer is formed on the surface of the niobium sintered body having thereon a dielectric material. In the case where the electrically conducting polymer is an organic solvent-soluble polymer capable of solution coating, a method of coating the polymer on the surface of the sintered body to form an electrically conducting polymer layer is used.

One preferred example of the production method by solution polymerization is a method of dipping the niobium sintered body having formed thereon a dielectric layer in a solution containing an oxidizing agent (Solution 1) and subsequently dipping the sintered body in a solution containing a monomer and a dopant (Solution 2), thereby performing the polymerization to form an electrically conducting polymer layer on the surface of the sintered body. Also, the sintered body may be dipped in Solution 1 after it is dipped in Solution 2. Solution 2 used in the above-described method may be a monomer solution not containing a dopant. In the case of using a dopant, the dopant may be allowed to be present together in the solution containing an oxidizing agent.

The operation of performing these polymerization steps is repeated once or more, preferably from 3 to 20 times, per the niobium sintered body having thereon a dielectric material, whereby a dense and stratified electrically conducting polymer layer can be easily formed.

In the production method of a capacitor of the present invention, any oxidizing agent may be used insofar as it does not adversely affect the capacitor performance and the reductant of the oxidizing agent can work out to a dopant and elevate the electrically conductivity of the electrically conducting polymer. An industrially inexpensive compound easy to handle at the production is preferred.

Specific examples of the oxidizing agent include Fe(III)-base compounds such as $FeCl_3$, $FeClO_4$ and Fe (organic acid anion) salt; anhydrous aluminum chloride/cuprous chloride; alkali metal persulfates; ammonium persulfates; peroxides; manganeses such as potassium permanganate; quinines such as 2,3-dichloro-5,6-dicyano-1,4-benzoquinone (DDQ), tetrachloro-1,4-benzoquinone and tetracyano-1,4-benzoquinone; halogens such as iodine and bromine; peracid; sulfonic acid such as sulfuric acid, fuming sulfuric acid, sulfur trioxide, chlorosulfuric acid, fluorosulfuric acid and amidosulfuric acid; ozone; and a mixture of a plurality of these oxidizing agents.

Examples of the fundamental compound of the organic acid anion for forming the above-described Fe (organic acid anion) salt include organic sulfonic acid, organic carboxylic acid, organic phosphoric acid and organic boric acid. Specific examples of the organic sulfonic acid include benzenesulfonic acid, p-toluenesulfonic acid, methanesulfonic acid, ethanesulfonic acid, α-sulfonaphthalene, β-sulfonaphthalene, naphthalenedisulfonic acid and alkyl-naphthalenesulfonic acid (examples of the alkyl group include butyl, triisopropyl and di-tert-butyl).

Specific examples of the organic carboxylic acid include acetic acid, propionic acid, benzoic acid and oxalic acid. Furthermore, polymer electrolyte anions such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid may also be used in the present invention. These organic sulfuric acids and organic carboxylic acids are mere examples and the present invention is not limited thereto. Examples of the counter cation to the above-described anion include $H^+$, alkali metal ions such as $Na^+$ and $K^+$, and ammonium ions substituted by a hydrogen atom, a tetramethyl group, a tetraethyl group, a tetrabutyl group or a tetraphenyl group, however, the present invention is not limited thereto. Among these oxidizing agents, preferred are oxidizing agents containing a trivalent Fe-base compound, cuprous chloride, an alkali persulfate, an ammonium persulfate or a quinone.

For the anion having a dopant ability which is allowed to be present together, if desired, in the production of a polymer composition for the electrically conducting polymer (anion other than the reductant anion of the oxidizing agent), an electrolyte anion having as a counter anion an oxidizing agent anion (reductant of oxidizing agent) produced from the above-described oxidizing agent, or other electrolyte anion may be used. Specific examples thereof include protonic acid anions including halide anion of Group 5B elements, such as $PF_6^-$, $SbF_6^-$ and $AsF_6^-$; halide anion of Group 3B elements, such as $BF_4^-$; halogen anion such as $I^-(I_3^-)$, $Br^-$ and $Cl^-$; perhalogenate anion such as $ClO_4^-$; Lewis acid anion such as $AlCl_4^-$, $FeCl_4^-$ and $SnCl_5^-$; inorganic acid anion such as $NO_3^-$ and $SO_4^{2-}$; sulfonate anion such as p-toluenesulfonic acid, naphthalenesulfonic acid and alkyl-substituted naphthalenesulfonic acid having from 1 to 5 carbon atoms (hereinafter simply referred to as "C1–5"); organic sulfonate anion such as $CF_3SO_3^-$ and $CH_3SO_3^-$; and carboxylate anion such as $CH_3COO^-$ and $C_6H_5COO^-$.

Other examples include polymer electrolyte anions such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid. However, the present invention is not limited thereto. Among these anions, preferred is a high molecular or low molecular organic sulfonic acid compound or polyphosphoric acid compound. Preferably, an aromatic sulfonic acid compound (e.g., sodium dodecylbenzenesulfonate, sodium naphthalenesulfonate) is used as the anion-donating compound.

Among the organic sulfonate anions, more effective dopants are a sulfoquinone compound having one or more sulfo-anion group ($-SO_3^-$) and a quinone structure within the molecule, and an anthracene sulfonate anion.

Examples of the fundamental skeleton for the sulfoquinone anion of the above-described sulfoquinone compound include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenquinone, 5,6-chrysenquinone, 6,12-chrysenquinone, acenaphthoquinone, acenaphthenequinone, camphorquinone, 2,3-bornanedione, 9,10-phenanthrenequinone and 2,7-pyrenequinone.

In the case where the another part electrode is solid, an electrically conducting layer may be provided thereon so as to attain good electrical contact with an outside leading line (for example, lead frame) which is used, if desired.

The electrically conducting layer can be formed, for example, by the solidification of an electrically conducting paste, plating, metallization or formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the second electrode and these are molded with a material such as epoxy resin, thereby fabricating a capacitor. This capacitor may have a niobium or tantalum lead which is sintered and molded integrally with the niobium sintered body or welded afterward.

The thus-fabricated capacitor of the present invention is jacketed using, for example, resin mold, resin case, metallic jacket case, dipping of resin or laminate film, and then used as a capacitor product for various uses.

In the case where the another part electrode is liquid, the capacitor fabricated from the above-described two electrodes and dielectric material is housed, for example, in a can electrically connected to the another part electrode to complete the capacitor. In this case, the electrode side of the niobium sintered body is guided outside through a niobium or tantalum lead described above and at the same time, insulated from the can using an insulating rubber or the like.

By producing a sintered body for capacitors using the niobium powder produced according to the embodiment of the present invention described in the foregoing pages and producing a capacitor from the sintered body, a capacitor having a small leakage current and good reliability can be obtained.

The capacitor of the present invention has a larger electrostatic capacitance for the volume than the conventional tantalum capacitors and therefore, a more compact capacitor product can be obtained.

The capacitor of the present invention having such properties can be applied to uses, for example, as a by-pass capacitor or a coupling capacitor which are frequently used in an analogue circuit and a digital circuit, and also to uses of conventional tantalum capacitors.

In general, such a capacitor is frequently used in an electronic circuit and when the capacitor of the present invention is used, the limitation in the arrangement of electronic parts or the discharge of heat can be relieved, as a result, an electronic circuit having high reliability can be disposed in a narrower space than that necessary for conventional electronic circuits.

Furthermore, when the capacitor of the present invention is used, an electronic instrument having smaller size and higher reliability than conventional ones can be obtained, such as computer, computer peripheral equipment (e.g., PC card), mobile equipment (e.g., portable telephone), home appliance, equipment mounted on vehicles, artificial satellite and communication equipment.

EXAMPLES

The present invention is described in detail below by referring to Examples and Comparative Examples, however, the present invention is not limited to these Examples.

In each Example, the tapping density, the angle of repose, the particle size, the pore size and the capacitance and leakage current of the capacitor were measured by the following methods.

(1) Measurement of Tapping Density

The tapping density was measured in accordance with the Method by Tapping Apparatus and the Measuring Instrument in the Apparent Specific Gravity Measuring Method of Industrial Sodium Carbonate specified in JIS (Japanese Industrial Standard, Edition of 2000) K1201-1.

(2) Measurement of Angle of Repose

The angle of repose was measured using the flowability measuring instrument and the sample amount specified in JIS (Japanese Industrial Standard, Edition of 2000) Z2504. More specifically, niobium powder was dropped on a horizontal plane from the hopper lower part at a height of 6 cm from the horizontal plane and the angle of the slant face from the apex of the circular cone generated to the horizontal plane was designated as the angle of repose.

(3) Measurement of Particle Size

Using an apparatus manufactured by Microtrack (HRA 9320-X100), the particle size distribution was measured by the laser diffraction scattering method. A particle size value ($D_{50}$; $\mu$m) when the accumulated vol % corresponded to 50 vol % was designated as the average particle size.

(4) Measurement of Pore Size

Using Poresier 9320 manufactured by Micro Meritics, the pore size distribution was measured by the mercury press-fitting method. The maximal value was determined from the rate of change in the press-fitted amount and the pore size shown by the maximal value was designated as the peak top.

(5) Measurement of Capacitance of Capacitor

The LCR meter manufactured by Hewlett-Packard was connected between terminals of the produced chip at room temperature and the capacitance at 120 Hz was designated as the capacitance of the capacitor processed into a chip.

(6) Measurement of Leakage Current of Capacitor

The current value measured after a d.c. voltage of 6.3 V was continuously applied between terminals of the produced chip for 1 minute at room temperature was designated as the leakage current value of the capacitor processed into a chip.

Example 1

Into a nickel-made crucible, 5,000 g of potassium fluoroniobate thoroughly vacuum-dried at 80° C. and sodium in a molar amount of 10 times the potassium fluoroniobate were charged and allowed to undertake a reduction reaction at 1,000° C. for 20 hours in an argon atmosphere. After the completion of reaction, the reduction product was cooled, washed with water, washed with 95% sulfuric acid and then with water in sequence, vacuum-dried and pulverized for 40 hours using a ball mill of alumina pot containing silica alumina balls. The pulverized product was dipped and stirred in a 3:2 (by mass) mixed solution of 50% nitric acid and 10% aqueous hydrogen peroxide, thoroughly washed with water until the pH reached 7 to remove impurities, and then vacuum-dried. The starting material niobium powder had an average particle size of 1.2 $\mu$m.

In a niobium-made pot, 500 g of this starting material niobium powder was placed and thereto, 50 g of butyl polymethylmethacrylate having an average particle size of 1 $\mu$m and 1 liter of toluene were added. Furthermore, zirconia balls were added and the contents were mixed for 1 hour using a shaking mixer. After removing zirconia balls, the mixture was placed in a conical drier and vacuum-dried under the conditions of $1\times10^2$ Pa and 80° C.

Subsequently, this niobium powder was heated under $1\times10^{-2}$ Pa at 250 to 400° C. for 12 hours to decompose and remove butyl polymethylmethacrylate, and then sintered under reduced pressure of $4\times10^{-3}$ Pa at 1,150° C. for 2 hours. The niobium sintered lump was cooled until the product temperature was lowered to 30° C. or less, and then cracked using a roll granulator to obtain a niobium cracked powder having an average particle size of 100 μm.

This niobium cracked powder was subjected to a nitridation treatment at 300° C. for 2 hours by passing nitrogen therethrough under pressure and about 450 g of niobium powder was obtained. The nitrogen content was 0.22%.

The physical properties of this niobium powder, such as tapping density, average particle size, angle of repose, BET specific surface area and pore size peak top, are shown in Table 1.

The thus-obtained niobium powder was charged into the hopper of a tantalum device automatic molding machine (TAP-2R, manufactured by Seiken) and automatically molded together with a 0.3 mmφ niobium wire to manufacture a molded article (about 0.1 g) of approximately 0.3×0.18×0.45 cm. The outer appearance and the dispersion in the weight of the molded article are shown in Table 1.

This molded article was left standing in a vacuum of $4\times10^{-3}$ Pa at 1,250° C. for 30 minutes to obtain a sintered body. 100 Units of this sintered body were prepared and each was subjected to electrolytic forming with an aqueous 0.1% phosphoric acid solution at a voltage of 20 V for 200 minutes to form an oxide dielectric film on the surface.

Subsequently, an operation of dipping the sintered body in an aqueous 60% manganese nitrate solution and then heating it at 220° C. for 30 minutes was repeated to form a manganese dioxide layer as the another part electrode layer on the oxide dielectric film. On this electrode layer, a carbon layer and a silver paste layer were stacked in this order. After mounting a lead frame thereon, the device as a whole was molded with an epoxy resin to manufacture a chip-type capacitor. The cathode agent impregnation ratio of the capacitor, and the average capacitance and the average leakage current (hereinafter simply referred to as "LC") of the chip-type capacitors (n=100 units) are shown in Table 1. The LC value is a value measured at room temperature by applying a voltage of 6.3 V for 1 minute.

Example 2

In an SUS 304-made reactor, 1,000 g of a niobium ingot was placed and thereinto, hydrogen was continuously introduced at 400° C. for 10 hours. After cooling, the hydrogenated niobium lump was placed in an SUS 304-made pot containing zirconia balls and pulverized for 10 hours. Thereafter, this hydride was formed into a 20 vol % slurry with water, charged together with zirconia balls into a spike mill, and wet-pulverized at 40° C. or less for 7 hours to obtain a pulverized slurry of niobium hydride. This starting material niobium hydride powder had an average particle size of 0.9 μm.

In an SUS-made pot, this slurry was charged and thereto, 200 g of barium oxide having an average particle size of 1 μm was added. Furthermore, zirconia balls were added and the contents were mixed for 1 hour using a shaking mixer. After removing zirconia balls, the mixture was placed in a niobium-made vat and dried under the conditions of $1\times10^2$ Pa and 50° C.

Subsequently, the obtained mixture was heated under $1\times10^{-2}$ Pa at 400° C. for 4 hours to dehydrogenate the niobium hydride, and then sintered under reduced pressure of $4\times10^{-3}$ Pa at 1,100° C. for 2 hours. The resulting barium oxide-mixed niobium sintered lump was cooled until the product temperature was lowered to 30° C. or less, and then cracked using a roll granulator to obtain a barium oxide-mixed niobium cracked powder having an average particle size of 95 μm.

Into a Teflon-made container, 500 g of this barium oxide-mixed niobium cracked powder and 1,000 g of ion exchange water were charged and cooled to 15° C. or less. Separately, an aqueous solution obtained by mixing 600 g of 60% nitric acid, 150 g of 30% hydrogen peroxide and 750 g of ion exchange water and cooled to 15° C. or less was prepared. Then, 500 g of this aqueous solution was added dropwise with stirring to an aqueous solution having suspended therein the barium oxide-mixed niobium cracked powder while taking care not to allow the water temperature to exceed 20° C. After the completion of dropwise addition, the solution was continuously stirred for another 1 hour, left standing for 30 minutes and then decanted. Thereto, 2,000 g of ion exchange water was added and the resulting solution was stirred for 30 minutes, left standing for 30 minutes and then decanted. This operation was repeated 5 times. Thereafter, the niobium cracked powder was charged into a Teflon-made column and washed with water for 4 hours while flowing ion exchange water. At this time, the electrical conductivity of the washing water was 0.9 μS/cm.

After the completion of water washing, the niobium cracked powder was dried at 50° C. under reduced pressure and subjected to a nitridation treatment at 300° C. for 3 hours by passing nitrogen therethrough under pressure, as a result, about 350 g of niobium powder was obtained. The nitrogen content was 0.28%.

The physical properties of this niobium powder, such as tapping density, average particle size, angle of repose, BET specific surface area and average pore size, are shown in Table 1.

The thus-obtained niobium powder was charged into the hopper of a tantalum device automatic molding machine (TAP-2R, manufactured by Seiken) and automatically molded together with a 0.3 mmφ niobium wire to manufacture a molded article (about 0.1 g) of approximately 0.3×0.18×0.45 cm. The outer appearance and the dispersion in the weight of the molded article are shown in Table 1.

This molded article was left standing under reduced pressure of $4\times10^{-3}$ Pa at 1,250° C. for 30 minutes to obtain a sintered body. 100 units of this sintered body were prepared and each was subjected to electrolytic forming with an aqueous 0.1% phosphoric acid solution at a voltage of 20 V for 200 minutes to form an oxide dielectric film on the surface.

Subsequently, an operation of contacting the oxide dielectric film with an equivalent mixed solution of an aqueous 10% ammonium persulfate solution and an aqueous 0.5% anthraquinonesulfonic acid solution and then with pyrrole vapor was repeated at least 5 times to form another part electrode (counter electrode) comprising polypyrrole on the oxide dielectric film.

On this counter electrode, a carbon layer and a silver paste layer were stacked in this order. After mounting a lead frame thereon, the device as a whole was molded with an epoxy resin to manufacture a chip-type capacitor. The cathode agent impregnation ratio of this capacitor, and the average capacitance and the average LC value of the chip-type capacitors (n=100 units) are shown in Table 1. The LC value is a value measured at room temperature by applying a voltage of 6.3 V for 1 minute.

Examples 3 to 10

Niobium powders, molded articles thereof, sintered bodies and capacitors were produced in the same manner as in Example 1 except for changing the average particle size and the amount added of the butyl polymethylmethacrylate, or in the same manner as in Example 2 except for changing the average particle size and the amount added of the barium oxide. The physical properties of niobium powder, the outer appearance and dispersion in the weight of molded article, and the capacitance and LC of capacitor are shown in Table 1.

Examples 11 to 21

Niobium powders, molded articles and sintered bodies of Examples 11 to 14 and 16 to 18 were produced in the same manner as in Example 1 and niobium powders, molded articles and sintered bodies of Examples 15 and 19 to 21 were produced in the same manner as in Examples 2, each except for using the activator shown in Table 1 in place of the butyl polymethylmethacrylate or barium oxide. The physical properties of niobium powder, and the outer appearance and dispersion in the weight of molded article are shown in Table 1.

These molded articles were then left standing under reduced pressure of $4 \times 10^{-3}$ Pa at 1,250° C. for 30 minutes to obtain sintered bodies. 100 units of each sintered body were prepared and subjected to electrolytic forming with an aqueous 0.1% phosphoric acid solution at a voltage of 20 V for 200 minutes to form an oxide dielectric film on the surface.

Subsequently, each sintered body having formed thereon a dielectric material was dipped in an aqueous solution containing 25 mass % of ammonium persulfate (Solution 1), pulled up, dried at 80° C. for 30 minutes, dipped in an isopropanol solution containing 18 mass % of 3,4-ethylenedioxythiophene (Solution 2), pulled up and then left standing in an atmosphere of 60° C. for 10 minutes, thereby performing the oxidation polymerization. This sintered body was again dipped in Solution 1 and then treated in the same manner as above. The operation from the dipping in Solution 1 until the oxidation polymerization was repeated 8 times. Then, the sintered body was washed with warm water at 50° C. for 10 minutes and dried at 100° C. for 30 minutes, whereby another part electrode (counter electrode) comprising electrically conducting poly(3,4-ethylenedioxythiophene) was formed.

On this counter electrode, a carbon layer and a silver paste layer were stacked in this order. After mounting a lead frame thereon, the device as a whole was molded with an epoxy resin to manufacture a chip-type capacitor. The cathode agent impregnation ratio of this capacitor, and the average capacitance and the average LC value of the chip-type capacitors (n=100 units) are shown in Table 1. The LC value is a value measured at room temperature by applying a voltage of 6.3 V for 1 minute.

Examples 22 to 24

Niobium powders, sintered bodies and capacitors were produced in the same manner as in Example 2 except for using, as the starting material, a niobium-tin alloy powder in Example 22, a niobium hydride-rhenium alloy powder in Example 23, and a niobium hydride-yttrium-boron alloy powder in Example 24. The physical properties, the capacitance and the LC are shown in Table 1.

Comparative Examples 1 to 3

Into a nickel-made crucible, 2,000 g of potassium fluoroniobate thoroughly vacuum-dried at 80° C. and sodium in a molar amount of 10 times the potassium fluoroniobate were charged and allowed to undertake a reduction reaction at 1,000° C. for 20 hours in an argon atmosphere. After the completion of reaction, the reduction product was cooled, washed with water, washed with 95% sulfuric acid and then with water in sequence, vacuum-dried and pulverized using a ball mill of alumina pot containing silica alumina balls by varying the pulverization time. The pulverized products each was dipped and stirred in a 3.2 (by weight) mixed solution of 50% nitric acid and 10% aqueous hydrogen peroxide, thoroughly washed with water until the pH reached 7 to remove impurities, and then vacuum-dried. The produced niobium powders had an average particle size of 1.3 to 10 $\mu$m.

Subsequently, 50 g of each of the thus-obtained niobium powder was placed in an SUS 304-made reactor and thereinto, nitrogen was continuously introduced at 300° C. for 2 to 4 hours to obtain a niobium nitride.

The physical properties of each niobium powder, such as tapping density, average particle size, angle of repose, BET specific surface area and average pore size, are shown in Table 1.

The thus-obtained niobium powders each was charged into the hopper of a tantalum device automatic molding machine (TAP-2R, manufactured by Seiken) and the automatic molding together with a 0.3 mm$\phi$ niobium wire was attempted. The results obtained are shown in Table 1.

Comparative Examples 4 to 9

Niobium powders having a tapping density of 0.2 to 0.4 g/ml or 2.6 to 3.3 g/ml were obtained in the same manner as in Example 2 except for changing the amount added of the barium oxide having an average particle size of 1 $\mu$m. The physical properties thereof are shown in Table 1.

The thus-obtained niobium powders each was charged into the hopper of a tantalum device automatic molding machine (TAP-2R, manufactured by Seiken) and automatically molded together with a 0.3 mm$\phi$ niobium wire to manufacture molded articles (about 0.1 g) of approximately 0.3×0.18×0.45 cm. The outer appearance and dispersion in the weight of these molded articles are shown in Table 1.

These molded articles were left standing in a vacuum of $4\times10^{-3}$ Pa at 1,250° C. for 30 minutes to obtain sintered bodies. 100 Units of each sintered body were prepared and subjected to electrolytic forming with an aqueous 0.1% phosphoric acid solution at a voltage of 20 V for 200 minutes to form an oxide dielectric film on the surface.

Subsequently, an operation of contacting the oxide dielectric film with an equivalent mixed solution of an aqueous 10% ammonium persulfate solution and an aqueous 0.5% anthraquinonesulfonic acid solution and then with pyrrole vapor was repeated at least 5 times, whereby another part electrode (counter electrode) comprising polypyrrole was formed on the oxide dielectric film.

On this counter electrode, a carbon layer and a silver paste layer were stacked in this order. After mounting a lead frame thereon, the device as a whole was molded with an epoxy resin to manufacture a chip-type capacitor. The cathode agent impregnation ratio of the capacitor, and the average capacitance and the average LC value of the chip-type capacitors (n=100 units) are shown in Table 1. The LC value is a value measured at room temperature by applying a voltage of 6.3 V for 1 minute.

TABLE 1

| | Additive | | | Physical Properties of Niobium Powder | | | | |
|---|---|---|---|---|---|---|---|---|
| | Kind | Amount Added (mass %) | Average Particle Size (μm) | Tapping Density (g/ml) | Average Particle Size (μm) | Angle of Repose (°) | BET Specific Surface Ratio (m²/g) | Pore Size Peak Top (μm) |
| Example 1 | butyl polymethylmethacrylate | 10 | 1 | 0.7 | 120 | 42 | 1.4 | 1.2 |
| Example 2 | BaO | 17 | 1 | 1.1 | 95 | 45 | 1.6 | 1.1 |
| Example 3 | butyl polymethylmethacrylate | 5 | 1 | 1.2 | 120 | 40 | 1.4 | 1.0 |
| Example 4 | butyl polymethylmethacrylate | 1 | 1 | 1.9 | 120 | 37 | 1.2 | 0.8 |
| Example 5 | BaO | 35 | 1 | 0.5 | 95 | 53 | 1.8 | 0.9 |
| Example 6 | BaO | 25 | 1 | 0.8 | 95 | 48 | 1.7 | 1.0 |
| Example 7 | BaO | 17 | 3 | 1.1 | 95 | 45 | 1.6 | 2.8 |
| Example 8 | BaO | 17 | 5 | 1.2 | 95 | 45 | 1.4 | 5.3 |
| Example 9 | BaO | 17 | 9 | 1.5 | 95 | 40 | 1.2 | 7.5 |
| Example 10 | BaO | 17 | 21 | 1.7 | 95 | 35 | 0.9 | 22 |
| Example 11 | camphor | 40 | 100 | 1.9 | 180 | 32 | 1.3 | 78 |
| Example 12 | butyl polyacrylate | 8 | 10 | 1.7 | 250 | 30 | 1.4 | 7.5 |
| Example 13 | polyvinyl alcohol | 3 | 3 | 1.2 | 80 | 49 | 1.4 | 3.2 |
| Example 14 | ZnO | 15 | 3 | 1.1 | 85 | 44 | 1.7 | 2.4 |
| Example 15 | $Re_2O_7$ | 10 | 4 | 1.0 | 110 | 42 | 1.8 | 3.1 |
| Example 16 | $WO_2$ | 7 | 3 | 1.3 | 100 | 45 | 1.6 | 3.1 |
| Example 17 | $SnO_2$ | 10 | 0.8 | 1.2 | 85 | 48 | 1.6 | 0.8 |
| Example 18 | MgO | 20 | 3 | 1.1 | 90 | 45 | 1.8 | 2.6 |
| Example 19 | $Mn(NO_3)_2$ | 10 | 2 | 1.5 | 100 | 43 | 1.5 | 2.3 |
| Example 20 | $CaCO_3$ | 10 | 1 | 1.0 | 85 | 42 | 1.7 | 0.8 |
| | | 5 | 5 | | | | | 5.8 |
| Example 21 | $Y_2O_3$ | 3 | 0.7 | 1.1 | 90 | 46 | 1.6 | 0.9 |
| | $B_2O_3$ | 15 | 1 | | | | | 1.4 |
| Example 22 | BaO | 17 | 1 | 1.0 | 95 | 46 | 1.4 | 1.2 |
| Example 23 | BaO | 17 | 1 | 1.1 | 90 | 45 | 1.5 | 0.9 |
| Example 24 | $Mn(NO_3)_2$ | 17 | 1 | 1.1 | 85 | 49 | 1.3 | 1.3 |
| Comp. Ex. 1 | — | 0 | — | 2.6 | 1.3 | 75 | 3.1 | 0.7 |
| Comp. Ex. 2 | — | 0 | — | 2.9 | 2.6 | 72 | 1.5 | 1.9 |
| Comp. Ex. 3 | — | 0 | — | 3.0 | 10 | 69 | 0.49 | 9.0 |
| Comp. Ex. 4 | BaO | 41 | 1 | 0.4 | 95 | 49 | 1.8 | 0.8 |
| Comp. Ex. 5 | BaO | 45 | 1 | 0.3 | 90 | 56 | 1.9 | 0.8 |
| Comp. Ex. 6 | BaO | 50 | 1 | 0.2 | 65 | 59 | 2.2 | 0.9 |
| Comp. Ex. 7 | BaO | 0.8 | 1 | 2.6 | 85 | 48 | 1.2 | 0.7 |
| Comp. Ex. 8 | BaO | 0.6 | 1 | 3.0 | 90 | 48 | 1.0 | 0.6 |
| Comp. Ex. 9 | BaO | 0.4 | 1 | 3.3 | 100 | 44 | 0.9 | 0.6 |

| | Sintered Body | | | Electrical Properties | |
|---|---|---|---|---|---|
| | Outer Appearance: chipping, cracking, distortion | Dispersion in Weight (g/sintered body) | Cathode Agent Impregnation Ratio (%) | Capacitance (μF) | LC (μA) |
| Example 1 | none | 0.1 ± 0.002 | 92 | 409 | 13 |
| Example 2 | none | 0.1 ± 0.002 | 91 | 460 | 19 |
| Example 3 | none | 0.1 ± 0.002 | 92 | 409 | 17 |
| Example 4 | none | 0.1 ± 0.002 | 89 | 387 | 15 |
| Example 5 | none | 0.1 ± 0.002 | 90 | 472 | 21 |
| Example 6 | none | 0.1 ± 0.002 | 92 | 460 | 22 |
| Example 7 | none | 0.1 ± 0.002 | 88 | 563 | 26 |
| Example 8 | none | 0.1 ± 0.002 | 91 | 523 | 18 |

TABLE 1-continued

| | | | | | |
|---|---|---|---|---|---|
| Example 9 | none | 0.1 ± 0.002 | 93 | 419 | 13 |
| Example 10 | none | 0.1 ± 0.002 | 91 | 263 | 5 |
| Example 11 | none | 0.1 ± 0.002 | 90 | 392 | 19 |
| Example 12 | none | 0.1 ± 0.002 | 90 | 387 | 12 |
| Example 13 | none | 0.1 ± 0.002 | 93 | 539 | 25 |
| Example 14 | none | 0.1 ± 0.002 | 89 | 516 | 22 |
| Example 15 | none | 0.1 ± 0.002 | 92 | 501 | 14 |
| Example 16 | none | 0.1 ± 0.002 | 89 | 512 | 17 |
| Example 17 | none | 0.1 ± 0.002 | 92 | 408 | 11 |
| Example 18 | none | 0.1 ± 0.002 | 95 | 608 | 23 |
| Example 19 | none | 0.1 ± 0.002 | 91 | 382 | 17 |
| Example 20 | none | 0.1 ± 0.002 | 94 | 588 | 29 |
| Example 21 | none | 0.1 ± 0.002 | 90 | 446 | 21 |
| Example 22 | none | 0.1 ± 0.002 | 91 | 450 | 13 |
| Example 23 | none | 0.1 ± 0.002 | 93 | 558 | 15 |
| Example 24 | none | 0.1 ± 0.002 | 91 | 446 | 13 |
| Comp. Ex. 1 | could not be molded | | — | — | — |
| Comp. Ex. 2 | could not be molded | | — | — | — |
| Comp. Ex. 3 | could not be molded | | — | — | — |
| Comp. Ex. 4 | present | 0.1 ± 0.015 | 91 | 396 | 18 |
| Comp. Ex. 5 | present | 0.1 ± 0.026 | 92 | 409 | 18 |
| Comp. Ex. 6 | present | 0.1 ± 0.046 | 95 | 432 | 17 |
| Comp. Ex. 7 | none | 0.1 ± 0.002 | 42 | 143 | 9 |
| Comp. Ex. 8 | none | 0.1 ± 0.002 | 37 | 115 | 7 |
| Comp. Ex. 9 | none | 0.1 ± 0.002 | 22 | 64 | 5 |

Effect of the Invention

By preparing a niobium powder having a tapping density of 0.5 to 2.5 g/ml, a sintered body having good flowability, capable of continuous molding and reduced in the leakage current can be stably produced. The capacitor manufactured from the sintered body is favored with good impregnation property, reduced dispersion and high reliability.

What is claimed is:

1. A niobium powder for a capacitor having a tapping density of 0.5 to 2.5 g/ml, and having an angle of repose of from 10° to 60°.

2. The niobium powder as claimed in claim 1, wherein an average particle size is from 10 to 1,000 μm.

3. The niobium powder as claimed in claim 1, wherein the BET specific surface area is from 0.5 to 40 m²/g.

4. The niobium powder as claimed in claim 1, which has a pore distribution having a pore diameter peak top in the range of 0.01 μm to 500 μm.

5. The niobium powder as claimed in claim 4, wherein the pore distribution has a plurality of pore diameter peak tops.

6. The niobium powder as claimed in claim 4, wherein any of the pore diameter peak tops is in the range of 0.5 to 100 μm.

7. The niobium powder as claimed in claim 1, wherein at least one element selected from the group consisting of nitrogen, carbon, boron and sulfur elements is contained in an amount of 200,000 mass ppm or less.

8. A sintered body using the niobium powder as claimed in claim 1.

9. The sintered body as claimed in claim 8, which has a pore distribution having a pore diameter peak top in the range of 0.01 μm to 500 μm.

10. The niobium sintered body as claimed in claim 8, wherein the sintered body has a volume of 10 mm³ or more including the volume of pore void.

11. The niobium sintered body as claimed in claim 8, wherein the sintered body has a specific surface area of 0.2 to 7 m²/g.

12. The niobium sintered body as claimed in claim 8, wherein a part of the sintered body is nitrided.

13. The niobium sintered body as claimed in claim 8, wherein the sintered body is a sintered body obtained from a niobium molded article which gives a sintered body having a CV value of 40,000 to 200,000 μFV/g when sintered at 1,300° C.

14. A capacitor comprising one electrode using the niobium sintered body claimed in claim 8, a counter electrode and a dielectric material interposed therebetween.

15. The capacitor as claimed in claim 14, wherein the dielectric material mainly comprises niobium oxide.

16. The capacitor as claimed in claim 14, wherein the counter electrode is at least one material selected from the group consisting of an electrolytic solution, an organic semiconductor and an inorganic semiconductor.

17. The capacitor as claimed in claim 16, wherein the counter electrode is an organic semiconductor and the organic semiconductor is at least one material selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an electrically conducting polymer.

18. The capacitor as claimed in claim 17, wherein the electrically conducting polymer is at least one member selected from the group consisting of polypyrrole, polythiophene, polyaniline and substitution derivatives thereof.

19. The capacitor as claimed in claim 17, wherein the electrically conducting polymer is an electrically conducting polymer obtained by doping a dopant into a polymer containing a repeating unit represented by the following formula (1) or (2):

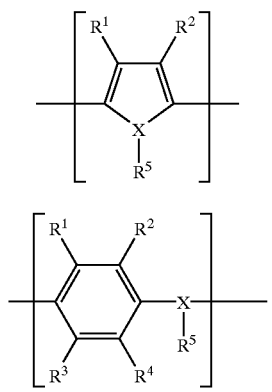

(wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; each of the pairs of $R^1$ and $R^2$, and $R^3$ and $R^4$ may combine at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents a hydrogen atom or a linear or branched, saturated or unsaturated alkyl group having from 1 to 10 carbon atoms).

20. The capacitor as claimed in claim 19, wherein the electrically conducting polymer is an electrically conducting polymer containing a repeating unit represented by the following formula (3):

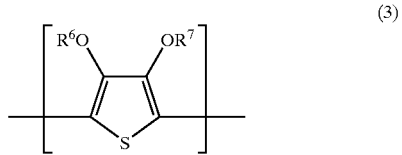

(wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements resulting from the alkyl groups combining with each other at an arbitrary position; and the cyclic structure includes a structure having a vinylene bond which may be substituted, and a phenylene structure which may be substituted).

21. The capacitor as claimed in claim 17, wherein the electrically conducting polymer is an electrically conducting polymer obtained by doping a dopant into poly(3,4-ethylenedioxythiophene).

22. The capacitor as claimed in claim 14, wherein the counter electrode is formed of a material at least partially having a layer structure.

23. The capacitor as claimed in claim 14, wherein the material of the counter electrode contains an organic sulfonate anion as a dopant.

24. A method for producing a capacitor comprising one electrode using a niobium sintered body, a dielectric material formed on the surface of the sintered body and a counter electrode provided on the dielectric material, wherein the niobium sintered body is the niobium sintered body claimed in claim 8.

25. An electronic circuit using the capacitor as claimed in claim 14.

26. An electronic instrument using the capacitor as claimed in claim 14.

27. A method for producing the niobium powder claimed in claim 1, comprising activation-treatment of niobium or a niobium compound.

28. The method for producing the niobium powder as claimed in claim 27, wherein the activation treatment of niobium or a niobium compound is performed by at least one step selected from the group consisting of a sintering step and a cracking step.

29. The method for producing the niobium powder as claimed in claim 27, wherein the activation treatment of niobium or a niobium compound is performed using a mixture of niobium or a niobium compound and an activator.

30. The method for producing the niobium powder as claimed in claim 27, wherein the average particle size of the niobium or niobium compound processed with the activation treatment is from 0.01 µm to 10 µm.

31. The method for producing the niobium powder as claimed in claim 27, wherein the niobium or niobium compound contains at least one element selected from the group consisting of nitrogen, carbon, boron and sulfur in an amount of 200,000 ppm or less.

32. The method for producing the niobium powder as claimed in claim 27, wherein the niobium compound is at least one member selected from the group consisting of niobium hydride, niobium alloy and niobium hydride alloy.

33. The method for producing the niobium powder as claimed in claim 32, wherein the component other than niobium contained in the niobium alloy or niobium hydride alloy is at least one element selected from the group consisting of elements having an atomic number of 88 or less excluding hydrogen, nitrogen, oxygen, fluorine, chlorine, bromine, iodine, niobium, helium, neon, argon, krypton, xenon and radon.

34. The method for producing the niobium powder as claimed in claim 29, wherein the mixture containing niobium or a niobium compound and an activator is obtained by mixing these using a solvent.

35. The method for producing the niobium powder as claimed in claim 34, wherein the solvent is at least one solvent selected from the group consisting of water, alcohols, ethers, cellosolves, ketones, aliphatic hydrocarbons, aromatic hydrocarbons and halogenated hydrocarbons.

36. The method for producing the niobium powder as claimed in claim 29, wherein the activator is used in an amount of 1 to 40 mass % based on the total amount of the niobium or niobium compound.

37. The method for producing the niobium powder as claimed in claim 29, wherein the average particle size of the activator is from 0.01 µm to 500 µm.

38. The method for producing the niobium powder as claimed in claim 29, wherein the activator has a plurality of particle size peak tops.

39. The method for producing the niobium powder as claimed in claim 29, wherein the activator is a substance which is removed as a gas at 2,000° C. or less.

40. The method for producing the niobium powder as claimed in claim 39, wherein the activator is at least one member selected from the group consisting of naphthalene, anthracene, quinone, camphor, polyacrylic acid, polyacrylic acid ester, polyacrylamide, polymethacrylic acid, polymethacrylic acid ester, polymethacrylamide, polyvinyl alcohol, $NH_4Cl$, $ZnO$, $WO_2$, $SnO_2$ and $MnO_3$.

41. The method for producing the niobium powder as claimed in claim 29, wherein the activator is at least one member selected from the group consisting of a water-soluble substance, an organic solvent-soluble substance, an acidic solution-soluble substance, an alkaline solution-soluble substance, a substance which forms a complex and becomes a substance soluble in water, organic solvent, acidic solution or alkaline solution, and a substance which becomes a substance soluble in water, organic solvent, acidic solution or alkaline solution at 2,000° C. or less.

42. The method for producing the niobium powder as claimed in claim 41, wherein the activator is at least one member selected from the group consisting of compounds of a metal with carbonic acid, sulfuric acid, sulfurous acid, halogen, perhalogen acid, hypohalogen acid, nitric acid, nitrous acid, phosphoric acid, acetic acid, oxalic acid or boric acid, metals, metal hydroxides and metal oxides.

43. The method for producing the niobium powder as claimed in claim 41, wherein the activator is at least one member selected from the group consisting of lithium, sodium, potassium, rubidium, cesium, francium, beryllium, magnesium, calcium, strontium, barium, radium, scandium, yttrium, cerium, neodymium, titanium, zirconium, hafnium, vanadium, niobium, tantalum, molybdenum, tungsten, manganese, rhenium, ruthenium, osmium, cobalt, rhodium, iridium, nickel, palladium, platinum, silver, gold, zinc, cadmium, boron, aluminum, gallium, indium, thallium, silicon, germanium, tin, lead, arsenic, antimony, bismuth, selenium, tellurium, polonium and compounds thereof.

44. The method for producing the niobium powder as claimed in claim 27, wherein the activation treatment is a treatment of removing the activator by heating and/or under reduced pressure before or during the sintering step.

45. The method for producing the niobium powder as claimed in claim 27, wherein the activation treatment is a treatment of removing the activator component by contacting a solvent with the sintered or cracked product after the sintering step and during or after the cracking step.

46. The method for producing the niobium powder as claimed in claim 45, wherein the solvent is at least one member selected from the group consisting of water, an organic solvent, an acidic solution, an alkaline solution and a solution containing a ligand of forming a soluble complex.

47. The method for producing the niobium powder as claimed in claim 46, wherein the acidic solution is a solution of at least one member selected from the group consisting of nitric acid, sulfuric acid, hydrofluoric acid and hydrochloric acid.

48. The method for producing the niobium powder as claimed in claim 46, wherein the alkaline solution contains at least one member selected from the group consisting of an alkali metal hydroxide and ammonia.

49. The method for producing the niobium powder as claimed in claim 46, wherein the ligand is at least one member selected from the group consisting of ammonia, glycine and ethylenediaminetetraacetic acid.

50. The method for producing the niobium powder as claimed in claim 46, wherein the organic solvent is methyl isobutyl ketone.

51. A niobium powder obtained by the production method as claimed in claim 27.

52. A method for producing a nitrogen-containing niobium powder, comprising treating the niobium powder claimed in claim 1 by at least one method selected from the group consisting of liquid nitridation, ion nitridation and gas nitridation.

53. A method for producing a carbon-containing niobium powder, comprising treating the niobium powder claimed in claim 1 by at least one method selected from the group consisting of solid phase carbonization and liquid carbonization.

54. A method for producing a boron-containing niobium powder, comprising treating the niobium powder claimed in claim 1 by at least one method selected from the group consisting of gas boronization and solid phase boronization.

55. A method for producing a sulfur-containing niobium powder, comprising treating the niobium powder claimed in claim 1 by at least one method selected from the group consisting of gas sulfudization, ion sulfudization and solid phase sulfudization.

56. A method for producing a niobium sintered body, using the niobium powder claimed in claim 1.

57. A method for producing a capacitor comprising one electrode using a niobium sintered body, a dielectric material formed on the surface of the sintered body and a counter electrode provided on the dielectric material, wherein the niobium sintered body is obtained by sintering the niobium powder claimed in claim 1.

58. The method for producing a capacitor as claimed in claim 57, wherein the dielectric material is formed by electrolytic oxidation.

* * * * *